United States Patent
Bentabet et al.

(10) Patent No.: US 11,675,966 B2
(45) Date of Patent: Jun. 13, 2023

(54) TABLE OF CONTENTS GENERATION

(71) Applicant: FORTIA FINANCIAL SOLUTIONS, Paris (FR)

(72) Inventors: Najah-Imane Bentabet, Montreuil (FR); Rémi Juge, Paris (FR); Sira Ferradans, Paris (FR)

(*) Notice: Subject to any disclaimer, the term of this patent is extended or adjusted under 35 U.S.C. 154(b) by 187 days.

(21) Appl. No.: 16/412,589

(22) Filed: May 15, 2019

(65) Prior Publication Data

US 2020/0364291 A1 Nov. 19, 2020

(51) Int. Cl.
| | |
|---|---|
| G06F 40/137 | (2020.01) |
| G06F 16/901 | (2019.01) |
| G06N 3/08 | (2023.01) |
| G06F 40/14 | (2020.01) |
| G06F 40/30 | (2020.01) |
| G06F 40/106 | (2020.01) |
| G06F 40/131 | (2020.01) |
| G06F 40/221 | (2020.01) |
| G06F 40/258 | (2020.01) |
| G06F 16/34 | (2019.01) |

(52) U.S. Cl.
CPC ........ *G06F 40/137* (2020.01); *G06F 16/9017* (2019.01); *G06F 40/106* (2020.01); *G06F 40/131* (2020.01); *G06F 40/14* (2020.01); *G06F 40/221* (2020.01); *G06F 40/258* (2020.01); *G06F 40/30* (2020.01); *G06N 3/08* (2013.01); *G06F 16/345* (2019.01)

(58) Field of Classification Search
None
See application file for complete search history.

(56) References Cited

U.S. PATENT DOCUMENTS

| | | | | |
|---|---|---|---|---|
| 9,959,272 | B1* | 5/2018 | Čaněk | G06F 40/44 |
| 2006/0080309 | A1* | 4/2006 | Yacoub | G06K 9/00469 |
| 2009/0144614 | A1* | 6/2009 | Dresevic | G06F 40/137 |
| | | | | 715/239 |
| 2011/0145229 | A1* | 6/2011 | Vailaya | G06F 16/334 |
| | | | | 707/723 |
| 2015/0033116 | A1* | 1/2015 | McKinney | G06F 40/205 |
| | | | | 715/239 |
| 2015/0149893 | A1* | 5/2015 | Lukic | G06F 40/258 |
| | | | | 715/249 |

(Continued)

OTHER PUBLICATIONS

Convolutional neural networks: an overview and application in radiology, Rikiya Yamashita, et al., published online: Jun. 22, 2018.

(Continued)

*Primary Examiner* — Asher D Kells
(74) *Attorney, Agent, or Firm* — Jonathan W. Bingham

(57) ABSTRACT

Generating a table of contents from a computer document is disclosed. The computer document is converted into a markup language, from which a list of grouped textblocks is generated. Headings are detected from among the list of grouped textblocks. For a grouped textblock, a first vector corresponding to a semantic representation of the grouped textblock and a second vector based on evaluation of predefined features in the grouped textblock are generated. Based on the first and second vectors, the grouped textblock is classified as a heading or a plain-text using a trained classifier.

18 Claims, 11 Drawing Sheets

(56) References Cited

U.S. PATENT DOCUMENTS

| | | | | |
|---|---|---|---|---|
| 2015/0220490 A1* | 8/2015 | Barber | ............... | G06F 40/106 |
| | | | | 715/234 |
| 2016/0371254 A1* | 12/2016 | Yamagami | ............ | G16H 80/00 |
| 2016/0379091 A1* | 12/2016 | Lin | ................. | G06K 9/00724 |
| | | | | 382/156 |
| 2017/0278510 A1* | 9/2017 | Zhao | ..................... | G10L 15/04 |
| 2018/0129944 A1* | 5/2018 | Meunier | ............... | G06N 7/005 |
| 2019/0258854 A1* | 8/2019 | Hosabettu | ............... | G06K 9/66 |

OTHER PUBLICATIONS

A Critical Review of Recurrent Neural Networks for Sequence Learning, Zachary C. Lipton, et al., Jun. 5, 2015.
Vizualizing and understanding recurrent networks, Andrej Karpathy et al., Nov. 17, 2015.
Recurrent Highway Networks, Julian Georg Zilly et al., Jul. 4, 2017.

\* cited by examiner

CONTENTS

TABLES .................................................................................................. iii
FIGURES ................................................................................................. iv 1.0 INTRODUCTION ........................................................................... 1
2.0 DESIGN PROJECT BACKGROUND ........................................... 2
   2.1 Problem Definition .................................................................. 2
   2.2 Needs Analysis ......................................................................... 3
   2.3 Key Performance and Environmental Requirements ........... 4
   2.4 Deliverables .............................................................................. 5
      2.4.1 *Firmware Code* ................................................................ 5
      2.4.2 *Hardware* .......................................................................... 5
      2.4.3 *Report* ............................................................................... 5
3.0 SYSTEM DESIGN ........................................................................... 6
   3.1 On- & Off-Board Design .......................................................... 6
   3.2 Functional Block Descriptions ................................................ 8
   3.3 Hardware Implementation ...................................................... 8
   3.4 Linear Testing .......................................................................... 10
      3.4.1 *Gain Error* ....................................................................... 10
      3.4.2 *Offset Error* ..................................................................... 11
      3.4.3 *Differential Non-Linearity* .............................................. 12
      3.4.4 *Integral Non-Linearity* .................................................... 13
      3.4.5 *Total Unadjusted Error* ................................................... 14
      3.4.6 *Missing Codes* .................................................................. 15
   3.5 Dynamic Testing ....................................................................... 15
      3.5.1 *The FFT* ........................................................................... 16
      3.5.2 *Total Harmonic Distortion* .............................................. 18
      3.5.3 *Signal-To-Noise Ratio* ..................................................... 18
      3.5.4 *Spurious Free Dynamic Range* ...................................... 19
      3.5.5 *Two Tone Intermodulation Distortion* ........................... 20
      3.5.6 *Effective Number of Bits* ................................................ 20
4.0 USER INTERFACE ........................................................................ 20
5.0 RISK REDUCTION ....................................................................... 21
6.0 PROTOTYPE COST ...................................................................... 21
7.0 TEST PLAN .................................................................................... 22
8.0 PROJECT SCHEDULE .................................................................. 22
9.0 CONCLUSION ............................................................................... 23
REFERENCES ........................................................................................ 25
APPENDIX A – RELEVANT STANDARDS ....................................... A-1
APPENDIX B – BILL OF MATERIALS ............................................... B-1
APPENDIX C – GANTT CHART .......................................................... C-1

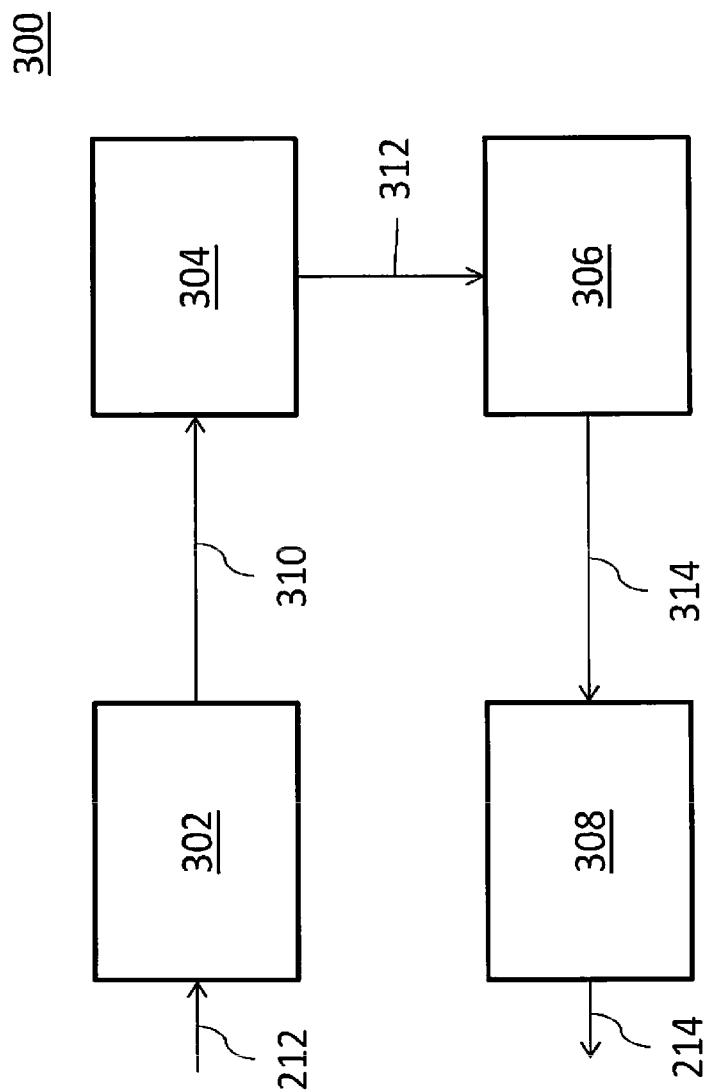

400

INFORMATIONS CLES POUR L'INVESTISSEUR

« Ce document fournit des informations essentielles aux investisseurs de cet OPCVM. Il ne s'agit pas d'un document promotionnel. Les informations qu'il contient vous sont fournies conformément à une obligation légale, afin de vous aider à comprendre en quoi consiste un investissement dans ce fonds et quels risques y sont associés. Il vous est conseillé de le lire pour décider en connaissance de cause d'investir ou non. »

Nom du fonds : BATI TAUX
Code ISIN : FR 0010057521
Fonds géré par SMA GESTION, société du Groupe SMA
OPCVM soumis au droit français 402    404

```
-<text top="167.197590" left="173.640072" width="246.688395" height="8.963996" font="2">
   <b>Fonds géré par SMA GESTION, société du Groupe SMA </b>
  </text>
-<text top="178.717585" left="224.040087" width="145.888236" height="8.963996" font="2">
   <b>OPCVM soumis au droit français</b>
  </text>
```

FIG. 5

```
▼ ⋮⋮ 2 = (TextBlock) Fonds géré par SMA GESTION, société du Groupe SMA OPCVM soumis au droit français
    ⊟ MAX_DISTANCE_FROM_OTHERS = (int) 15
    ⊟ MAX_HEADER_LENGTH = (int) 140
    ⊟ MAX_HEADER_LINES = (int) 15
    ⊟ MIN_HEADER_LENGTH = (int) 3
    ⊟ MIN_INDENT = (int) 10
    ⊟ MIN_TEXT_LENGTH = (int) 3
    ▶ ⋮⋮ _TextBlock__font_counter = (Counter) Counter({'Times_7_#000000': 81})
    ▶ ⋮⋮ _TextBlock__fonts = (dict) <class 'dict'>: {'Times_7_#000000': 81}
    ▶ ⋮⋮ _TextBlock__origin = (Tag) <text font="Times_7_#000000" height="8.963996" left="173.640072" top="167.197590" width="246.688395"><b>Fonds géré par SMA GESTION, société du Groupe SMA </b></text>
    ▼ ⋮⋮ aspect = (list) <class 'list'>: [(167.19759, 173.640072, 246.688395, 8.963996), (178.717585, 224.040087, 145.888236, 8.963996)]
        ⋮⋮ 0 = (tuple) <class 'tuple'>: (167.19759, 173.640072, 246.688395, 8.963996)
        ⋮⋮ 1 = (tuple) <class 'tuple'>: (178.717585, 224.040087, 145.888236, 8.963996)
        ⊟ _len_ = (int) 2
    ▶ ⋮⋮ attrs = (dict) <class 'dict'>: {'top': '167.197590', 'left': '173.640072', 'width': '246.688395', 'height': '8.963996', 'font': 'Times_7_#000000'}
    ⊟ clean_text = (str) 'Fonds géré par SMA GESTION, société du Groupe SMA OPCVM soumis au droit français'
    ▼ ⋮⋮ clean_text_list = (list) <class 'list'>: ['Fonds géré par SMA GESTION, société du Groupe SMA ', 'OPCVM soumis au droit français']
        ⊟ 0 = (str) 'Fonds géré par SMA GESTION, société du Groupe SMA '
        ⊟ 1 = (str) 'OPCVM soumis au droit français'
        ⊟ _len_ = (int) 2
    ▶ ⋮⋮ contents = (list) <class 'list'>: ['Fonds géré par SMA GESTION, société du Groupe SMA ', 'OPCVM soumis au droit français', ' ']
    ▼ ⋮⋮ full_text = (list) <class 'list'>: ['Fonds géré par SMA GESTION, société du Groupe SMA ', 'OPCVM soumis au droit français', ' ']
    ⊟ id = (str) '167.197590_173.640072'
    ⊟ image = (NoneType) None
    ⊟ image_class = (NoneType) None
    ⊟ is_fundname = (bool) False
    ⊟ is_header = (bool) False
    ⊟ page = (int) 1
    ⊟ pageh = (float) 842.0
    ⊟ pagew = (float) 595.0
    ▶ ⋮⋮ position = (tuple) <class 'tuple'>: (167.19759, 173.640072, 246.688395, 20.483591000000003)
    ⊟ seq = (int) 4
    ⊟ style = (str) 'b'
    ⊟ table_id = (int) -1
```

FIG. 6

TABLE OF CONTENTS GENERATION

FIELD

The present disclosure relates to table of contents (TOC) generation.

BACKGROUND

A table of contents (TOC) is a list of headings present in a document along with their respective start page numbers and their respective heading levels. TOC generation involves automatically creating a TOC from a computer document.

Conventional approaches for TOC generation are based on the assumption of a known hierarchical structure of documents. TOC generation accordingly involves detecting headings in the document and assigning them pre-defined entries in the hierarchical structure. Other conventional TOC generation approaches rely on printed TOC pages that appear at the beginning of the document.

However, these approaches are deficient when dealing with documents which are not embedded with a printed TOC or which vary in hierarchical structure.

BRIEF SUMMARY

Embodiments of the present disclosure provide a method for generating a table of contents (TOC) from a computer document. In an embodiment, the method comprises:

converting the computer document into a markup language file comprising a plurality of elements, each element corresponding to a respective element of the computer document;

generating a list of grouped textblocks from the markup language file, a grouped textblock comprising one or more layout-similar elements of the plurality of elements of the markup language file;

detecting headings from among the list of grouped textblocks, wherein detecting the headings comprises, for a grouped textblock of the list of grouped textblocks:

generating, using a first trained neural network, a first vector corresponding to a semantic representation of the grouped textblock;

generating a second vector based on evaluation of pre-defined features in the grouped textblock; and classifying, using a first trained classifier, the grouped textblock as a heading or a plain-text based on the first and second vectors.

As such, headings are detected in the computer document by analyzing both the text content (i.e., by reading the content) and the layout (i.e., by visualizing the document) of the computer document. This is advantageous because the two types of analysis work together to enhance heading detection and also to compensate for each other. For example, the layout analysis of the document would compensate for the text analysis if the computer document uses unusual text content for its headings. Conversely, if the computer document uses an unusual headings structure, the text analysis of the document would compensate for the layout analysis.

In embodiments, the computer document may be any document in which headings have a different layout format than plaint text. For example, so without limitation, the computer document may be a Portable Document File (PDF) document or a .DOC or .DOCX document.

The markup language file may be of any type. Without limitation, the markup language file may be an Extensible Markup Language (XML) file or a Hypertext Markup Language (HTML) file.

In an embodiment, an element of the markup language file includes the respective element of the computer document or a link thereto and layout information associated with the respective element of the computer document.

Without limitation, the first trained neural network may be a character-level convolutional neural network (CNN).

In an embodiment, the method comprises:

concatenating the first and second vectors;

applying a classification function on the concatenation of the first and second vectors to determine a probability that the grouped text block is a heading; and determining that the grouped textblock is a heading or a plain-text based on the determined probability. The classification function may be a softmax function, though other functions may also be used as would be understood by a person of skill in the art.

In an embodiment, the method comprises classifying the detected headings into pre-defined levels (e.g., Heading Level 1, heading level 2, etc.). The TOC can be generated based on the classification of the detected headings into the pre-defined levels.

In an embodiment, classifying the detected headings into pre-defined levels comprises, for a detected heading:

generating, using a second trained neural network, a third vector corresponding to a semantic representation of the detected heading;

generating a fourth vector based on evaluation of the pre-defined features in the detected heading; and classifying, using a second trained classifier, the detected heading as one so of the pre-defined levels based on the third and fourth vectors.

As such, detected headings are classified into the pre-defined levels by analyzing both the text content (i.e., by reading the content) and the layout (i.e., by visualizing the document) of the detected headings within the document. This is advantageous because the two types of analysis work together to enhance heading classification and also to compensate for each other. For example, the layout analysis would compensate for the text analysis if the detected headings use unusual text content (e.g., the content of detected headings does not correspond to what is typically found in training documents, for example the order of detected headings differing from the order found in training documents). Conversely, if the computer document uses an unusual headings structure, the text analysis of the document would compensate for the layout analysis.

Without limitation, the second trained neural network may be a word-level CNN or a word-level recurrent neural network (RNN).

In an embodiment, the method comprises:

concatenating the third and fourth vectors to generate a fifth vector;

convoluting the fifth vector with equivalent vectors associated with one or more preceding detected headings and one or more subsequent detected headings relative to the detected heading; and applying a classification function on the convolution result to determine a probability that the detected heading belongs to a given pre-defined level of the pre-defined levels; and assigning a pre-defined level to the detected heading based on the determined probability.

In an embodiment, generating the list of grouped textblocks comprises:

processing the markup language file to generate a list of text spans;

filtering out text spans corresponding to headers or footers from the list of text spans to generate a filtered list of text spans;

generating a list of textblocks from the filtered list of text spans; and generating the list of grouped textblocks from the list of textblocks.

Processing the markup language file to generate the list of text spans may comprise processing the markup language file to retain only elements corresponding to text elements of the computer document (210).

In an embodiment, generating the list of grouped textblocks comprises:

comparing layout information associated with at least two textblocks of the list of textblocks, the at least two textblocks being consecutive elements in the list of textblocks; and generating a grouped textblock based on the at least two textblocks depending on a result of said comparing.

In an embodiment, comparing the layout information associated with at least two textblocks comprises comparing the layout information of the at least two textblocks based on one or more of: font, font size, style, vertical position, and horizontal position.

In an embodiment, the generated grouped textblock comprises layout information based at least in part on a combination of layout information associated with the at least two textblocks.

In another aspect, embodiments of the present disclosure provide a non-transitory computer readable medium having computer instructions stored thereon, the computer instructions when executed by a processor cause the processor to perform a method for generating a TOC from a computer document according to any of the method embodiments described above.

In a further aspect, embodiments provide a computer system, comprising a processor and a memory storing computer instructions, the computer instructions when executed by the processor causes the processor to perform a method for generating a TOC from a computer document according to any of the method embodiments described above.

BRIEF DESCRIPTION OF THE DRAWINGS

Further features and advantages of the present disclosure will become apparent from the following description of certain embodiments thereof, given by way of illustration only, not limitation, with reference to the accompanying drawings in which:

FIG. 1 shows an example table of contents (TOC).

FIG. 3 is a block diagram of a layout parser according to an example embodiment.

FIG. 4 illustrates an example PDF file section.

FIG. 5 illustrates an example XML file section.

FIG. 6 illustrates an example layout parser output.

DETAILED DESCRIPTION OF EXAMPLE EMBODIMENTS

Embodiments of the present disclosure provide systems, methods, and computer program products for generating a table of contents (TOC) from a computer document. A TOC is a list of headings present in the document along with their respective start page numbers and their respective heading levels. An example TOC 100 is shown in FIG. 1.

According to embodiments, the computer document may be any document in which headings have a different layout format than plain text. Without limitation, the computer document may be a Portable Document File (PDF) document or a .DOC or .DOCX document.

Figure 2:
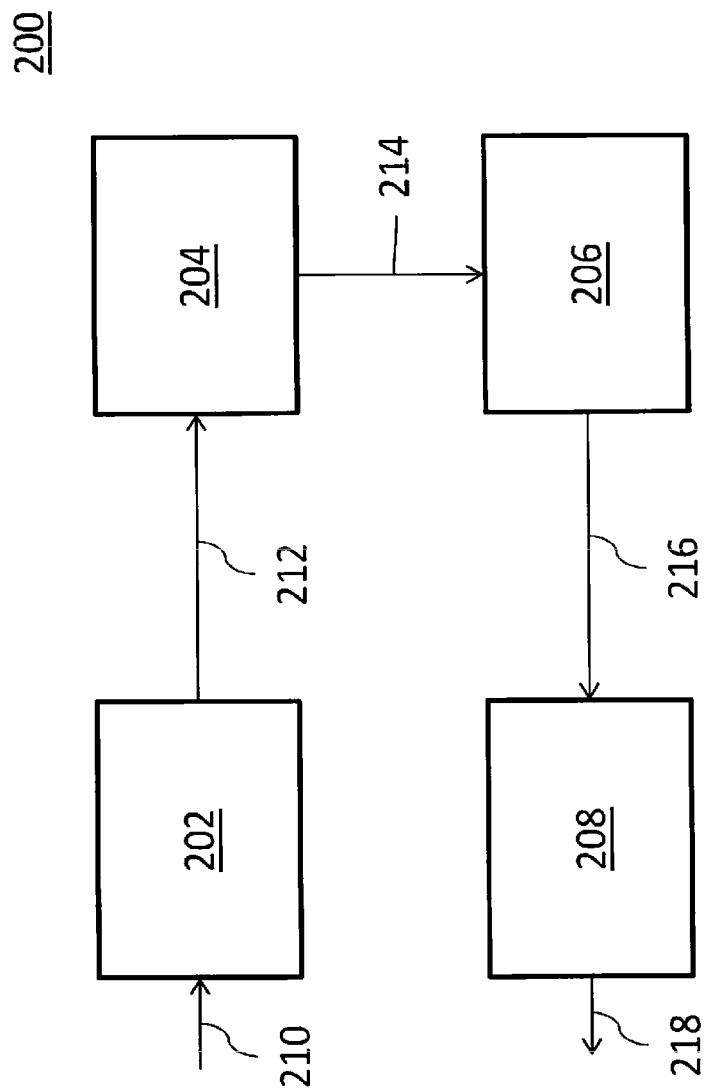
FIG. 2 is a block diagram of a TOC generator according to an example embodiment.

In an embodiment, TOC generation involves automatically creating a TOC from a computer document by using the content of the document, namely its layout and the text contained therein. FIG. 2 is a block diagram of a TOC generator 200 according to an example embodiment. TOC generator 200 is provided for the purpose of illustration only and is not limiting of embodiments of the present disclosure.

As shown in FIG. 2, TOC generator 200 includes a document convertor 202, a layout parser 204, a heading detector 206, and a heading classifier 208. ToC generator 200 receives as input a computer document 210 and generates as output a TOC 218. As mentioned before, computer document 210 may be any document in which headings have a different layout format than plain text. Without limitation, computer document 210 may be a PDF document or a .DOC or .DOCX document. Computer document 210 may contain text, tables, media, links, etc.

Document convertor 202 is configured to generate a markup language file 212 based on computer document 210. Document convertor 202 may be based on a known software tool, such as for example the "pdftohtml" tool provided by the Poppler software library.

Markup language file 212 may be of any type. Without limitation, markup language file 212 may be an Extensible Markup Language (XML) file or a Hypertext Markup Language (HTML) file.

Markup language file 212 describes the content of computer document 210 while maintaining the hierarchy of computer document 210 (i.e., the order in which elements appear in computer document 210). In an embodiment, the description can be configured according to a selected granularity which specifies the smallest element (e.g., text line, word, or character) of computer document 210 to be described.

In an embodiment, markup language file 212 describes each element of computer document 210 with a corresponding markup language element. The markup language element corresponding to an element of computer document 210 may include the element itself or a link thereto and its layout information. The layout information of an element of computer document 210 may include, where applicable, its coordinates in computer document 210, its font, its font size (positive integer quantifying the size of characters), its style (bold, italic, all caps), etc. For illustration, FIG. 5 shows an example section 500 of an XML file generated from the conversion of an example PDF file section 400 shown in FIG. 4. As shown, example section 500 includes two XML elements 502 and 504 which correspond respectively to the last two text lines 402 and 404 of example PDF file section 400. XML elements 502 and 504 contain respectively text lines 402 and 404 and their respective layout information (e.g., top, left, width, height, etc.).

Layout parser 204 is configured to receive markup language file 212 from document convertor 202 and to generate therefrom a list of grouped textblocks 214.

FIG. 3 is a block diagram of a layout parser 300 according to an example embodiment. Layout parser 300 is provided for the purpose of illustration only and is not limiting of embodiments of the present disclosure. Layout parser 300 may be an embodiment of layout parser 204.

As shown in FIG. 3, layout parser 300 includes a text span processor 302, a header/footer detector 304, a textblock generator 306, and a textblock parser 308.

Text span processor 302 is configured to process markup language file 212 to generate a list of text spans 310. In an embodiment, the list of text spans 310 includes the elements of markup language file 212 that correspond to text elements of computer document 210. As such, text span processor 302 discards non-text describing elements of markup language file 212.

Header/footer detector 304 is configured to filter out text spans corresponding to headers or footers from the list of text spans 310 to generate a filtered list of text spans 312.

In an embodiment, header/footer detection includes calculating a height ratio for each textspan of the list of text spans 310, calculating a median top height ratio and a median bottom height radio, and comparing the height ratio of the textspan to the median top height ratio and the median bottom height ratio. If the height ratio of the textspan is lower than the median bottom height ratio, then the textspan is signaled as a potential footer. If the height ratio of the textspan is higher than the median top height ratio, then the textspan is signaled as a potential header. A potential footer/header is retained as a header/footer if the corresponding textspan appears in more than, for example, 50% of the pages of the document or if the corresponding textspan is detected to correspond to a page number.

In an embodiment, the height ratio of a textspan is calculated as the ratio of the lower left vertical position value of the textspan to the height of the page. The median top height ratio is computed by calculating, for each page of the document, the height ratios of the top two text spans, and then by computing the median of the calculated height ratios over all pages. The median bottom height ratio is computed in a similar fashion using the bottom two text spans of each page.

Textblock generator 306 is configured to generate a list of textblocks 314 from the filtered list of text spans 312. A textblock is generated respectively from each text span of the filtered list of text spans 312. In an embodiment, a textblock is generated by adding additional attributes to the text span. FIG. 6 illustrates example additional attributes that may be found in a textblock. Without limitation, the additional attributes may include, for example, the coordinates of the textblock on the page on which the textblock appears, the style (bold, italic, etc.) of the textblock, the page number on which the textblock appears in the computer document, the height/width of the page, etc.

Textblock parser 308 is configured to generate the list of grouped textblocks 214 from the list of textblocks 314. In an embodiment, textblock parser 308 generates the list of grouped textblocks 214 by comparing the layout information of textblocks in the list of textblocks 314. Specifically, textblock parser 308 may compare the layout information associated with at least two consecutive textblocks of the list of textblocks 314 and may generate a grouped textblock based on the at least two consecutive textblocks depending on a result of the comparison. For example, textblock parser 308 may compare one or more of the font, font size, style, vertical position, and horizontal position of the at least two consecutive textblocks. If textblock parser 308 determines enough similarity between the at least two consecutive textblocks, textblock parser 308 may group the two textblocks into a grouped textblock. The grouped textblock includes layout information based, at least in part, on a combination of the layout information associated with the at least two textblocks. As such, a grouped textblock may comprise one or more layout-similar elements of the markup language file 212.

For illustration, FIG. 6 shows an example output 600 of layout parser 204 in response to example XML section 500 shown in FIG. 5. As shown, output 600 includes a textblock generated based on grouping together the XML elements 502 and 504 of example XML section 500. The textblock maintains the layout information of the grouped XML elements 502 and 504 (font, font size, style, list of coordinates of the grouped XML elements, etc.).

Returning to FIG. 2, heading detector 206 is configured to receive the list of grouped textblocks 214 and to detect headings 216 from among the list of grouped textblocks 214. Heading detector 206 is trained during a training phase using training data. Subsequently, the trained heading detector 206 can be used for inference.

Figure 7:
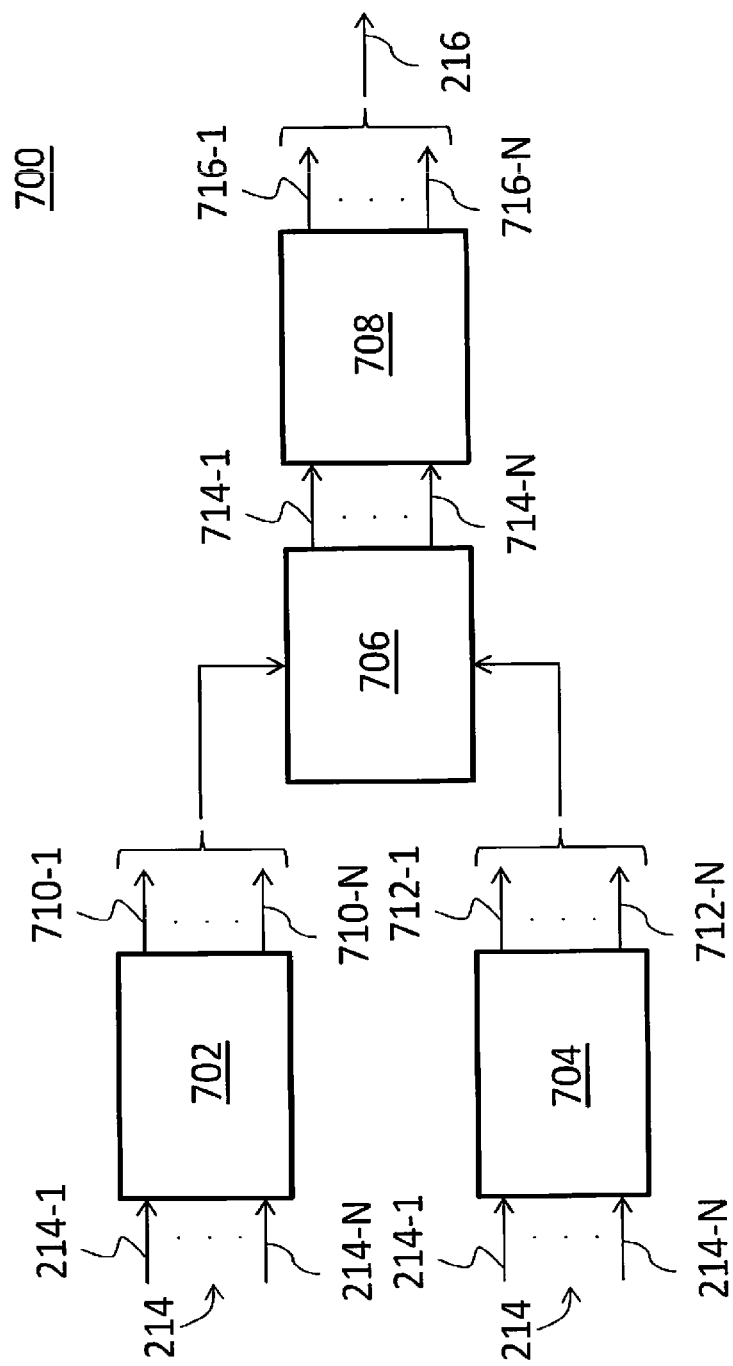
FIG. 7 is a block diagram of a heading detector according to an example embodiment.

FIG. 7 is a block diagram of a heading detector 700 according to an example embodiment. Heading detector 700 is provided for the purpose of illustration only and is not limiting of embodiments of the present disclosure. Heading detector 700 may be an embodiment of heading detector 206.

As shown in FIG. 7, heading detector 700 includes a trained neural network 702, a feature extractor 704, a concatenation block 706, and a trained classifier 708.

Neural network 702 is configured to receive the list of grouped textblocks 214 comprising N grouped textblocks 214-1, . . . , 214-N, where N is an integer. For each grouped textblock 214-1, . . . , 214-N, neural network 702 generates a respective first vector 710-1, . . . , 710-N corresponding to a semantic representation of the grouped textblock 214-1, . . . , 214-N. The first vector 710-1, . . . , 710-N may be used to assess whether the meaning of its corresponding grouped textblock 214-1, . . . , 214-N is "close" to the meaning of another grouped textblock (represented by an equivalent first vector 710) using an appropriate distance function.

In an embodiment, neural network 702 uses a sliding window of k characters to "read" (the text content of) a grouped textblock 214-1, . . . , 214-N k characters at a time (e.g., k=5) and to map the read k characters to a corresponding float vector representation of size L based on a predetermined mapping (embeddings layer). The resulting float vectors are then input into a global max pooling function, which selects, for each dimension (i.e., 0 to L−1) of the float vectors, the maximum float value from among the values of the float vectors corresponding to the dimension, and then concatenates the selected maximum float values to generate a combined vector. Subsequently, in an embodiment, a linear projection is applied onto the combined vector (e.g., using a fully-connected layer) to reduce its size.

In an embodiment, without limitation, neural network 702 may be implemented as a character-level convolutional neural network (CNN). For example, neural network 702 may use an existing deep learning library, such as Keras, Tensorflow, or Pytorch, for example. An overview of CNNs can be found for example in Yamashita et al., "Convolutional neural networks: an overview and application is radiology," Insights into Imaging, vol. 9, no. 4, pp. 611-629, August 2018.

Feature extractor 704 is configured to receive the list of grouped textblocks 214-1, . . . , 214-N and to generate, for each grouped textblock, a respective second vector 712-1, . . . , 712-N based on evaluation of pre-defined features in the grouped textblock. The pre-defined features are features generally indicative of headings in a document and may include layout and/or semantic features.

Figure 8:
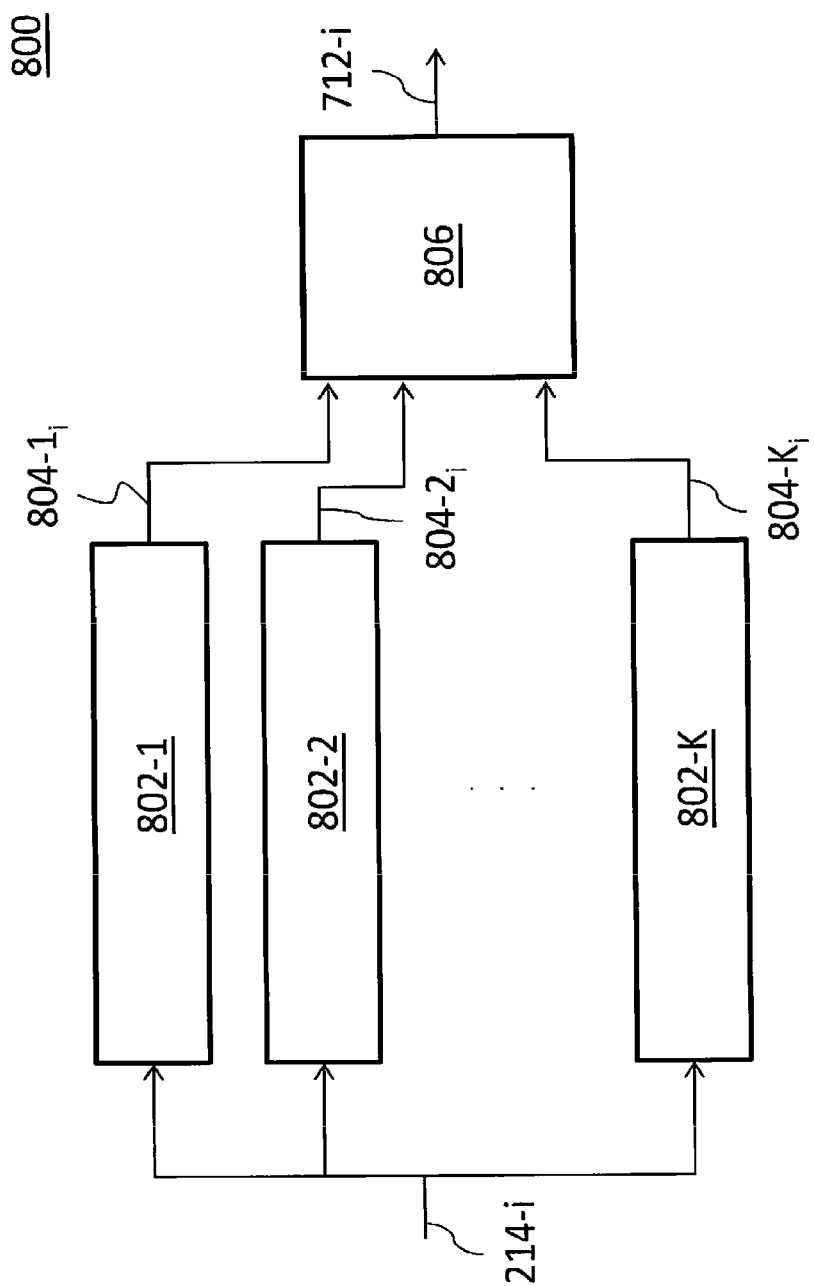
FIG. 8 is a block diagram of a feature extractor according to an example embodiment.

FIG. 8 is a block diagram of a feature extractor 800 according to an example embodiment. Heading detector 700 is provided for the purpose of illustration only and is not limiting of embodiments of the present disclosure. Feature extractor 800 may be an embodiment of feature extractor 704.

As shown in FIG. 8, feature extractor 800 processes the list of grouped textblocks 214-1, . . . , 214-N one by one. Specifically, for a grouped textblock 214-$i$, feature extractor 800 evaluates a plurality of K pre-defined features 802-1, . . . , 802-K with respect to the grouped textblock 214-$i$ to generate a plurality of vectors $804\_1_i$ . . . , $804\_K_i$. Vectors $804\_1_i$, . . . , $804\_K_i$ may vary in size between the pre-defined features. A concatenation block 806 concatenates vectors $804\_1_i$, . . . , $804\_K_i$ to generate a vector 712-$i$ for grouped textblock 214-$i$.

In an embodiment, feature extractor 704 may evaluate a grouped textblock 214-$i$ for one or more of the following pre-defined features:

- the length of the textblock (text_length);
- the font size of the textblock (font_size);
- the indentation of the textblock (indent);
- whether or not the textblock contains a verb (contains_verb);
- comparison between the style of the textblock and the style of the previous textblock in the document (style_to_prev);
- comparison between the style of the textblock and the style of the subsequent textblock in the document (style_to_subs);
- whether or not the textblock is in bold (is_bold);
- whether or not the textblock is in italic (is_italic);
- whether or not the textblock is all capitalized (is_all_caps);
- difference in font size with the previous textblock (size_diff_to_prev);
- difference in font size with the subsequent textblock (size_diff_to_subs);
- difference in weight with the previous textblock (weight_diff_to_prev);
- difference in weight with the subsequent textblock (weight_diff_to_subs);
- comparison between the font size of the textblock and the font size of the previous textblock (size_to_prev);
- comparison between the font size of the textblock and the font size of the subsequent textblock (size_to_subs);
- comparison between the indentation of the textblock and the indentation of the previous textblock (indent_to_prev);
- comparison between the indentation of the textblock and the indentation of the subsequent textblock (indent_to_subs);
- difference in indentation with the previous textblock (indent_diff_to_prev);
- difference in indentation with the subsequent textblock (indent_diff_to_subs);
- distance from the previous textblock (dist_to_prev_line);
- distance from the subsequent textblock (dist_to_subs_line);
- whether or not the textblock begins with a numbering (such as I/, A), 1.2, etc. . . . ) (begins_with_numbering);
- whether or not the color of the textblock is different from the color of the previous textblock (color_diff_to_prev);
- whether or not the color of the textblock is different from the color of the subsequent textblock (color_diff_to_subs);
- a binary vector representation of size 100 indicating if the words of a predefined vocabulary of words each appears in the textblock (one_hot);
- a binary vector representation of size 100 indicating if the words of a predefined vocabulary of words each appears in the previous textblock (prev_tb_one_hot);
- a binary vector representation of size 100 indicating if the words of a predefined vocabulary of words each appears in the subsequent textblock (subs_tb_one_hot).

In an embodiment, the vectors $804\_1_i$, . . . , $804\_K_i$ generated in response to evaluating a grouped textblock 214-$i$ for each of the above-described pre-defined features are provided for the purpose of illustration in Table 1 below.

TABLE 1

| Feature | Vector representation |
| --- | --- |
| text_length | Positive integer specifying the number of characters in the textblock. |
| font_size | Positive integer quantifying the size of characters in the textblock (e.g., 12, 14, etc.). |
| indent | Positive integer specifying the horizontal distance of the textblock from the left margin. |
| contains_verb | Binary integer (0 or 1) specifying whether the textblock contains a verb or not. An existing tool (e.g., Spacy) may be used to implement this feature. |
| style_to_prev | Integer (1, 2, or 3) comparing whether the style value of the textblock is smaller, equal, or larger than that of the textblock appearing immediately before it in the document. |
| style_to_subs | Integer (1, 2, or 3) comparing whether the style value of the textblock is smaller, equal, or larger than that of the textblock appearing immediately after it in the document. |
| is_bold | Binary integer (0 or 1) specifying whether the textblock is displayed in bold in the document. |
| is_italic | Binary integer (0 or 1) specifying whether the textblock is displayed in italic in the document. |
| is_all_caps | Binary integer (0 or 1) specifying whether the textblock is written in capital letters in the document. |
| size_diff_to_prev | Difference between the font size of the textblock and the font size of the textblock appearing immediately before it in the document. |
| size_diff_to_subs | Difference between the font size of the textblock and the font size of the textblock appearing immediately after it in the document. |
| weight_diff_to_prev | Difference between the weight value of the textblock and the weight value of the textblock appearing immediately before it in the document. |
| weight_diff_to_subs | Difference between the weight value of the textblock and the weight value of the textblock appearing immediately after it in the document. |

TABLE 1-continued

| Feature | Vector representation |
|---|---|
| size_to_prev | Integer (1, 2, or 3) comparing whether the font size of the textblock is smaller, equal, or larger than that of the textblock appearing immediately before it in the document. |
| size_to_subs | Integer (1, 2, or 3) comparing whether the font size of the textblock is smaller, equal, or larger than that of the textblock appearing immediately after it in the document. |
| indent_to_prev | Integer (1, 2, or 3) comparing whether the indentation of the textblock is smaller, equal, or larger than that of the textblock appearing immediately before it in the document. |
| indent_to_subs | Integer (1, 2, or 3) comparing whether the indentation of the textblock is smaller, equak, or larger than that of the textblock appearing immediately after it in the document |
| indent_diff_to_prev | Integer (positive or negative) specifying the difference between the indentation of the textblock and the indentation of the textblock appearing immediately before it in the document. |
| indent_diff_to_subs | Integer (positive or negative) specifying the difference between the indentation of the textblock and the indentation of the textblock appearing immediately after it in the document. |
| dist_to_prev_line | Integer (positive or negative) specifying the vertical distance between the textblock and the textblock appearing immediately before it in the document. |
| dist_to_subs_line | Integer (positive or negative) specifying the vertical distance between the textblock and the textblock appearing immediately after it in the document. |
| begins_with_numbering | Binary integer (0 or 1) specifying whether or not the textblock begins with a numbering such as I/, A), 1.2, etc . . .) |
| color_diff_to_prev | Binary integer (0 or 1) specifying whether or not the color of the textblock is the same or different than that of the textblock appearing immediately before it in the document. |
| color_diff_to_subs | Binary integer (0 or 1) specifying whether or not the color of the textblock is the same or different than that of the textblock appearing immediately after it in the document. |
| one_hot | Binary vector of size 100; each bin of the vector corresponds to a word in a pre-defined vocabulary composed of the 100 most common words in headings (determined from training documents). If a word of the vocabulary appears in the textblock, its corresponding bin contains 1, otherwise it contains 0. |
| prev_tb_one_hot | Binary vector of size 100; each bin corresponds to a word in a pre-defined vocabulary composed of the 100 most common words in headings (determined from training documents). If a word of the vocabulary appears in the previous textblock, its corresponding bin contains 1, otherwise it contains 0. |
| subs_tb_one_hot | Binary vector of size 100; each bin corresponds to a word in a pre-defined vocabulary composed of the 100 most common words in headings (determined from training documents). If a word of the vocabulary appears in the subsequent textblock, its corresponding bin contains 1, otherwise it contains 0. |

In an embodiment, the style value of a grouped textblock is determined based on its style according to Table 2 below.

TABLE 2

| style | Style value |
|---|---|
| neither "bold", "italic", nor "all_caps" | 0 |
| only "bold" | 1 |
| only "italic" | 1 |
| only "all_caps" | 1 |
| "bold" and "italic" | 2 |
| "bold" and "all_caps" | 2 |
| "italic" and "all_caps" | 2 |
| "bold" and "italic" and "all_caps" | 3 |

In an embodiment, the weight value of a grouped textblock is determined based on its style according to Table 3 below.

TABLE 3

| Style | weight value |
|---|---|
| neither "bold", "italic", nor "all_caps" | 0 |
| only "bold" | 3 |
| only "italic" | 2 |
| only "all_caps" | 1 |
| "bold" and "italic" | 5 |
| "bold" and "all_caps" | 4 |
| "italic" and "all_caps" | 3 |
| "bold" and "italic" and "all_caps" | 6 |

Returning to FIG. 7, concatenation block 706 concatenates the first vectors 710-1, . . . , 710-N with the respective second vectors 712-1, . . . , 712-N to generate third vectors 714-1, . . . , 714-N.

Classifier 708 acts on the third vectors 714-1, . . . , 714-N to generate a classification output 716-1, . . . , 716-N for the list of grouped textblocks 214-1, . . . , 214-N. The classification output 716-1, . . . , 716-N indicates for each textblock 214-1, . . . , 214-N whether it is a heading or not (e.g., 0 or 1). A list of detected headings 216 containing the M grouped textblocks detected as headings can be generated from the classification output 716-1, . . . , 716-N.

In an embodiment, classifier 708 is configured to apply a classification function on each of the third vectors 714-1, . . . , 714-N to determine a probability corresponding to whether the respective grouped text block 214-1, . . . , 214-N is a heading. A determination is made as to whether the grouped textblock 214-1, . . . , 214-N is a heading or a plain-text based on the determined probability.

Without limitation, the probability may be determined using a softmax function defined for a binary classification problem (i.e., Class 1=heading, Class 2=plain-text). As such, the probability that a grouped textblock belongs to a first class $C_1$ (e.g., heading) is determined by:

$$p(C_1 \mid x) = \frac{p(x \mid C_1)p(C_1)}{p(x \mid C_1)p(C_1) + p(x \mid C_2)p(C_2)} = \frac{1}{1 + \exp(-a)} = \sigma(a)$$

where x denotes the third vector 714 associated with the grouped textblock, $C_2$ denotes the second class (e.g., plain-text), a=transpose(x)·W where W are the weights associated with the first class of the trained classifier implementing the softmax function, and σ represents the sigmoid function. In an embodiment, the softmax function may be implemented using a classifier including a fully-connected layer with a sigmoid function as activation function. The fully-connected layer operates as a linear projection performing a dot product between the input x and the weights W. The result of the dot product is mapped to between 0 and 1 using the sigmoid function to obtain the probability value.

As would be understood by a person of skill in the art, other classification functions may also be used, including, for example, a decision tree classifier, a logistic regression classifier, or a hyperbolic tangent classifier.

As mentioned above, heading detector 206 is trained during a training phase before it is used for inference. As would be understood by a person skilled in the art, training a model includes providing training data to the model and the correct answers that the model should output based on the training data. For example, heading detector 206 may be provided lists of grouped textblocks and the correct answers (the headings within each list of grouped textblock) corresponding to them. At initialization, internal weights within heading detector 206 (e.g., weights of neural network 702 and classifier 708) are set at random. As each training list of grouped textblocks is applied to heading detector 206, an error between the correct answer and the answer output by heading detector 206 is generated. The error is used to adapt the internal weights of heading detector 206. The internal weights of heading detector 206 are fixed at the end of the training phase, meaning that heading detector 206 is trained.

In an embodiment, heading detector 206 may be trained to recognize the headings of a specific type of documents (e.g., news, finance, sports, etc.). This is done by tailoring both the training data and the correct answers provided therewith to the desired specific field. In one embodiment, without limitation, heading detector 206 may be trained to recognize headings typically appearing in financial documents, such as prospectuses for investment products.

Returning to FIG. 2, heading classifier 208 is configured to classify the detected headings 216 into pre-defined levels (e.g., Heading level 1, heading level 2, etc.) and to generate a TOC 218 based on the classification of the detected headings 216 into the pre-defined levels. Heading classifier 208 is trained during a training phase using training data. Subsequently, the trained heading classifier 208 can be used for inference.

Figure 9:
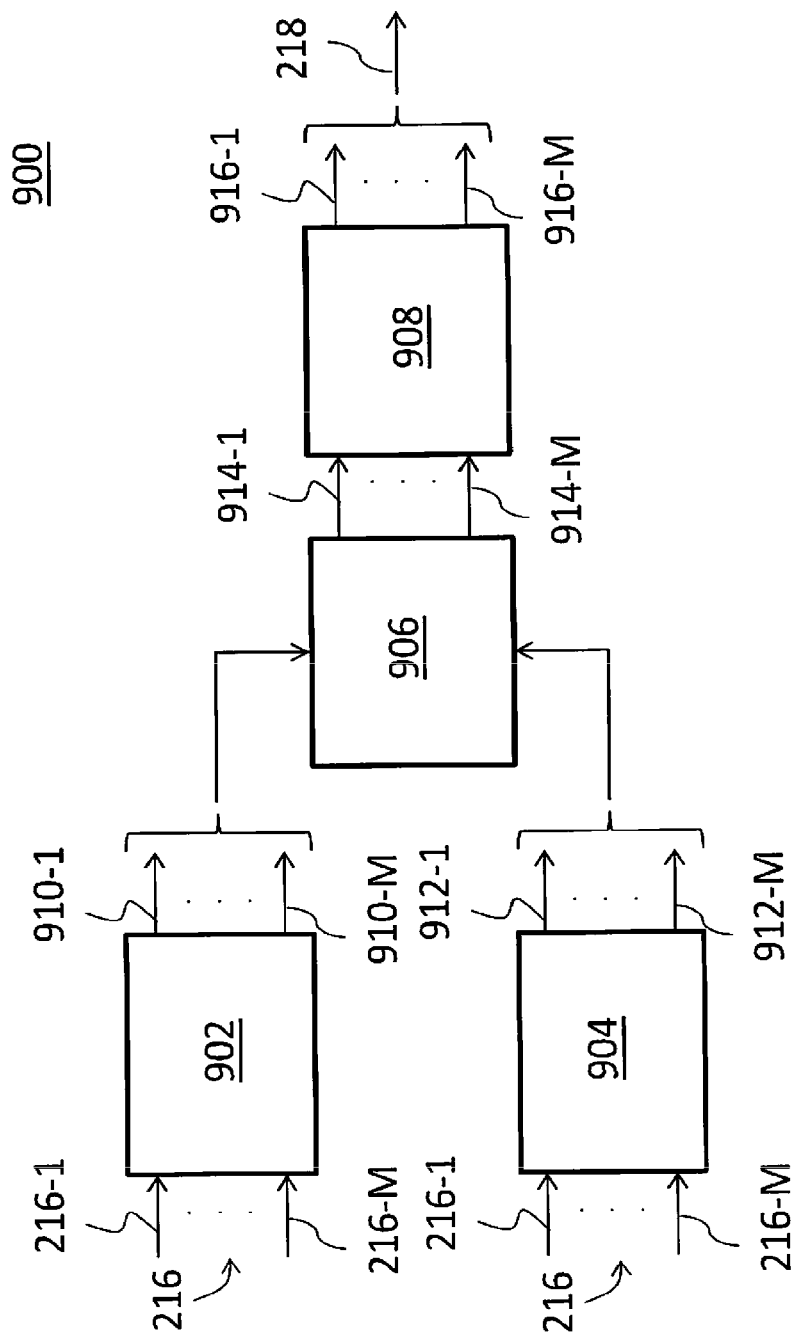
FIG. 9 is a block diagram of a heading classifier according to an example embodiment.

FIG. 9 is a block diagram of a heading classifier 900 according to an example embodiment. Heading classifier 900 is provided for the purpose of illustration only and is not limiting of embodiments of the present disclosure. Heading classifier 900 may be an embodiment of heading classifier 208.

As shown in FIG. 9, heading classifier 900 includes a trained neural network 902, a feature extractor 904, a concatenation block 906, and a sequence labeling block 908.

Neural network 902 is configured to receive the list of detected headings 216 comprising N detected headings 216-1, ..., 216-M. For each detected heading 216-1, ..., 216-M, neural network 902 generates a respective first vector 910-1, ..., 910-M corresponding to a semantic representation of the detected heading 216-1, ..., 216-M. The first vector 910-1, ..., 910-M may be used to assess whether the meaning of its corresponding detected heading 216-1, ..., 216-M is "close" to the meaning of another heading (represented by an equivalent first vector 910) using an appropriate distance function.

In an embodiment, neural network 902 uses a sliding window of j words to "read" (the text content of) a detected heading 216-1, ..., 216-M j words at a time (e.g., k=3) and to map the read j words to a corresponding float vector representation of size H based on a predetermined mapping (e.g., embeddings layer). The resulting float vectors are then input into a global max pooling function, which selects, for each dimension (i.e., 0 to H−1) of the float vectors, the maximum float value from among the values of the float vectors corresponding to the dimension, and then concatenates the selected maximum float values to generate a combined vector. Subsequently, in an embodiment, a linear projection is applied onto the combined vector (e.g., using a fully-connected layer) to reduce its size.

In an embodiment, without limitation, neural network 902 may be implemented as a word-level CNN. For example, neural network 902 may use an existing deep learning library, such as Keras, Tensorflow, or Pytorch, for example. Alternatively, neural network 902 may be implemented as a word-level recurrent neural network (RNN). A review of recurrent neural networks can be found for example in Lipton et al., "A critical review of recurrent network networks for sequence learning," CoRR, vol. abs/1506.00019, 2015 or in Karpathy et al., "Visualizing and understanding recurrent networks," CoRR, vol. abs/1506.02078, 2015.

Feature extractor 904 is configured to receive the list of detected headings 216-1, ..., 216-M and to generate, for each detected heading, a respective second vector 912-1, ..., 912-M based on evaluation of pre-defined features in the detected headings. In an embodiment, the same pre-defined features as discussed above with respect to feature extractor 704 may be used.

Concatenation block 906 concatenates the first vectors 910-1, ..., 910-M with the respective second vectors 912-1, ..., 912-M to generate third vectors 914-1, ..., 914-M.

Sequence labeling block 908 acts on the third vectors 914-1, ..., 914-M to generate a classification output 916-1, ..., 916-M for the list of detected headings 216-1, ..., 216-M. The classification output 916-1, ..., 916-M indicates for each detected heading 216-1, ..., 216-M its heading level (e.g., Heading level 1, heading level 2, etc.) from among the pre-defined levels. A TOC 208 listing the detected headings 216-1, ..., 216-M in accordance with their assigned levels can be generated from the classification output 916-1, ..., 916-M.

Figure 10:
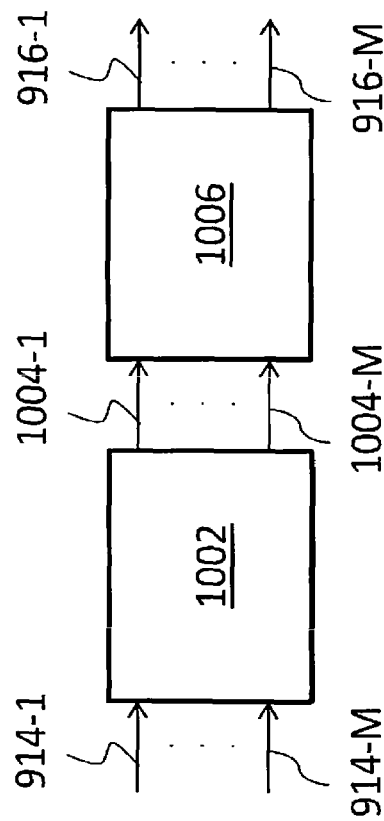
FIG. 10 is a block diagram of a sequence labeling block according to an example embodiment.

FIG. 10 is a block diagram of a sequence labeling block 1000 according an example embodiment. Sequence labeling block 1000 is provided for the purpose of illustration only and is not limiting of embodiments of the present disclosure. Sequence labeling block 1000 may be an embodiment of sequence labeling block 908. In an embodiment, without limitation, sequence labeling block 1000 may be used when neural network 902 is implemented as a CNN.

As shown in FIG. 10, sequence labeling block 1000 includes a convolution block 1002 and a trained classifier 1006.

Convolution block 1002 is configured to perform convolution operations on third vectors 914-1, ..., 914-N to generate convolution results 1004-1, ..., 1004-M. In an embodiment, for a third vector 914-$i$ (corresponding to a detected heading 216-$i$), convolution block 1002 is configured to convolute the third vector 914-$i$, based on a selected window size w (w≥1), with one or more preceding third vectors (e.g., 914-$(i-1)$, 914-$(i-2)$, etc.) and one or more subsequent third vectors (e.g., 914-$(i+1)$, 914-$(i+2)$, etc.) to generate the convolution result 1004-$i$, where the third vectors 914-$(i-1)$, 914-$(i-2)$, etc. correspond to the detected heading 216-$(i-1)$, 216-$(i-2)$, etc. and the third vectors 914-$(i+1)$, 914-$(i+2)$, etc. correspond to the detected heading 216-$(i+1)$, 216-$(i-2)$, etc. In another embodiment, convolutions results are obtained for different window sizes (e.g., w=1, w=2, etc.) for a given third vector 914-*i* and are then concatenated together to obtain the convolution result 1004-*i*.

Classifier 1006 is configured to apply a classification function on each of the convolution results 1004-1, ..., 1004-M to generation classification output 916-1, ..., 916-M. The classification output 916-1, ..., 916-M indicates for each detected heading 216-1, ..., 216-M its heading level (e.g., Heading level 1, heading level 2, etc.) from among the pre-defined levels.

In an embodiment, for each detected heading 216-1, ..., 216-M, classifier 1006 determines one or more probabilities corresponding to the detected heading belonging to one or more pre-defined levels of the pre-defined levels and assigns a pre-defined level to the detected heading based on the one or more determined probabilities.

In an embodiment, the classification function may be a softmax function. Depending on the number of pre-defined levels, the softmax function may be defined for a binary classification problem or for a multi-class classification problem.

For a binary classification problem (i.e., Class 1=heading level 1, Class 2=heading level 2), the probability that a detected heading belongs to a first class $C_1$ (e.g., heading level 1) is determined by:

$$p(C_1 | x) = \frac{p(x|C_1)p(C_1)}{p(x|C_1)p(C_1) + p(x|C_2)p(C_2)} = \frac{1}{1 + \exp(-a)} = \sigma(a)$$

where x denotes the convolution result 1004 associated with the detected heading, $C_2$ denotes the second class (e.g., heading level 2), a=transpose(x)·W where W are the weights associated with the first class of the trained classifier implementing the softmax function, and σ represents the sigmoid function.

For a multi-class classification problem (i.e., more than 2 classes), the probability that a detected heading belongs to class $C_k$ (heading level k) is determined by:

$$p(C_k | x) = \frac{p(x|C_k)p(C_k)}{\Sigma(x|C_j)p(C_j)} = \frac{\exp(a_k)}{\sum_j \exp(a_j)}$$

where x denotes the convolution result 1004 associated with the detected heading, $C_j$ denotes class j (e.g., heading level j), $a_k$=transpose(x)·$W_k$ where $W_k$ are the weights associated with the class $C_k$ of the trained classifier implementing the softmax function, and $a_j$=transpose(x)·$W_j$ where $W_j$ are the weights associated with the class $C_j$ of the trained classifier implementing the softmax function.

As would be understood by a person of skill in the art, other classification functions may also be used, including, for example, a support-vector machine (SVM) classifier, a decision tree classifier, or a Naive Bayes classifier.

As mentioned above, heading classifier 208 is trained during a training phase before it is used for inference. As would be understood by a person skilled in the art, training a model includes providing training data to the model and the correct answers that the model should output based on the training data. For example, heading classifier 208 may be provided sets of detected headings from documents and the correct answers (the heading levels within each set of detected headings) corresponding to them. At initialization, internal weights within heading classifier 208 (e.g., weights of neural network 902 and classifier 908) are set at random. As each training set of detected headings is applied to heading classifier 208, an error between the correct answer and the answer output by heading classifier 208 is generated. The error is used to adapt the internal weights of heading classifier 208. The internal weights of heading classifier 208 are fixed at the end of the training phase, meaning that heading classifier 208 is trained.

Figure 11:
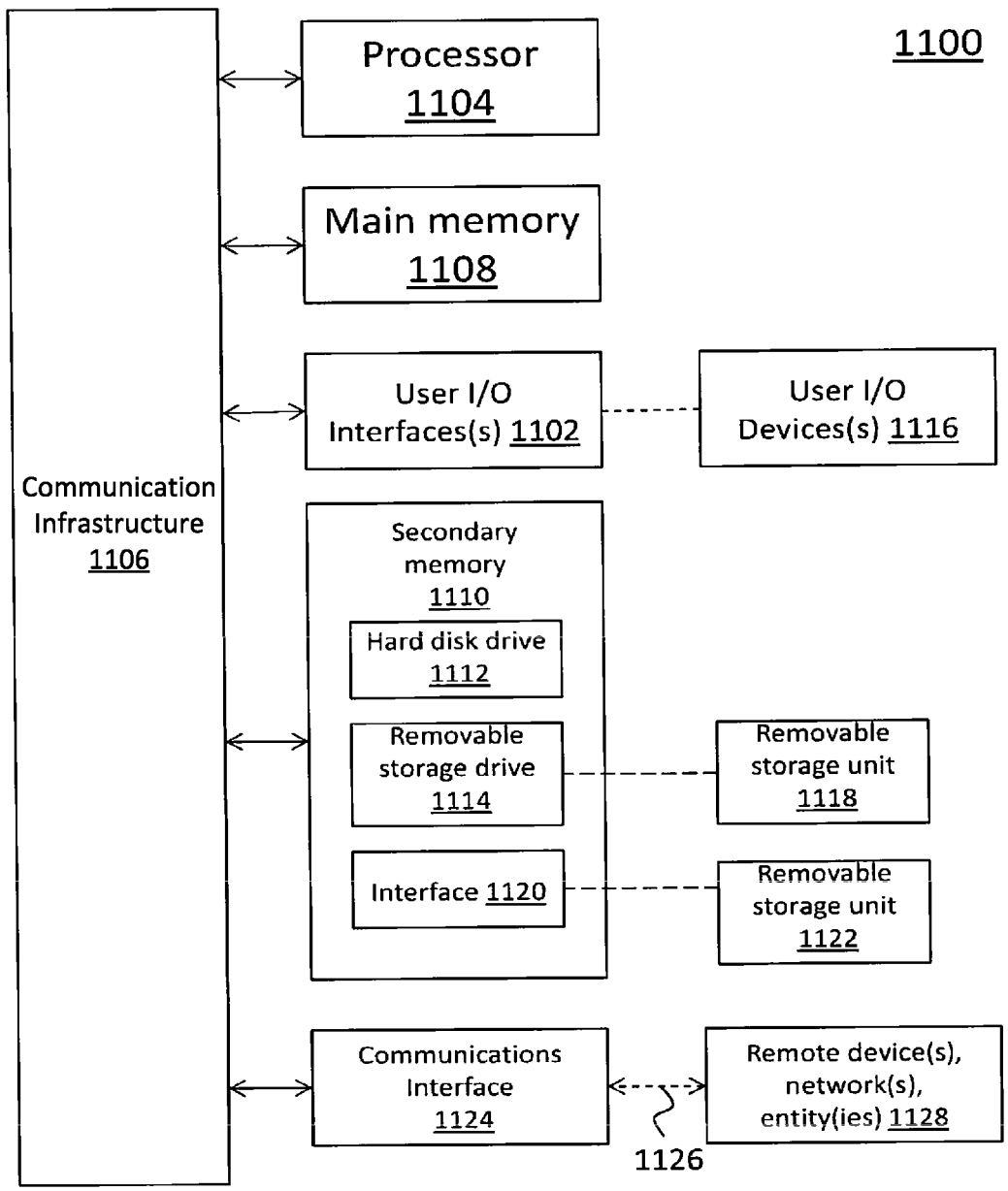
FIG. 11 illustrates an example computer system in which embodiments may be implemented.

FIG. 11 illustrates an example computer system 1100 in which embodiments may be implemented. Computer system 1100 includes one or more processors (also called central processing units, or CPUs), such as a processor 1104. Processor 1104 is connected to a communication infrastructure or bus 1106. Processor 1104 may be a graphics processing unit (GPU).

Computer system 1100 also includes user input/output device(s) 1116, such as monitors, keyboards, pointing devices, etc., which communicate with communication infrastructure 1106 through user input/output interface(s) 1102.

Computer system 1100 also includes a main or primary memory 1108, such as random access memory (RAM). Main memory 1108 may include one or more levels of cache. Main memory 1108 has stored therein control logic (i.e., computer software) and/or data that when executed by the one or more processors 1104 perform the above described embodiments, including the processes described in FIGS. 1-6.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, a tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to an example embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communications or network interface 1124. Communications interface 1124 enables computer system 1100 to communicate and interact with any combination of remote devices, remote networks, remote entities, etc. (individually and collectively referenced by reference number 1128). For example, communications interface 1124 may allow computer system 1100 to communicate with remote devices 1128 over a communications path 1126, which may be wired and/or wireless, and which may include any combination of LANs, WANs, the Internet, etc. Control logic and/or data may be transmitted to and from computer system 1100 via communication path 1126.

In an embodiment, a tangible apparatus or article of manufacture comprising a tangible computer useable or readable medium having computer instructions (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such computer instructions, when executed by one or more data processing devices (such as computer system 1100), cause such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 11.

Additional Variants

Although the present disclosure has been described above with reference to certain specific embodiments, it will be understood that the disclosure is not limited by the particularities of the specific embodiments. Numerous variations, modifications and developments may be made in the above-described embodiments within the scope of the appended claims.

The invention claimed is:

1. A method for generating a table of contents (TOC) from a computer document not containing an embedded TOC, the method comprising:
converting the computer document into a markup language file comprising a plurality of markup elements, each markup element corresponding to a respective document element of the computer document;
generating a list of grouped textblocks of markup elements from the markup language file, a grouped textblock comprising one or more layout-similar elements of the plurality of markup elements of the markup language file;
detecting a plurality of headings from among the list of grouped textblocks of markup elements, wherein detecting the headings comprises, for a grouped textblock of markup elements of the list of grouped textblocks of markup elements:
generating by a first trained neural network; a first vector corresponding to a semantic representation of the grouped textblock of markup elements, wherein the first vector is a semantic vector;
generating a second vector based on evaluation of pre-defined features in the grouped textblock of markup elements; and
classifying by a first trained classifier the grouped textblock of markup elements as a heading or a plain-text based on the first and second vectors,
wherein said classifying comprises:
concatenating the first and second vectors;
applying a classification function on the concatenation of the first and second vectors to determine a probability that the grouped textblock of markup elements is a heading; and
determining that the grouped textblock of markup elements is a heading or a plain-text based on the determined probability.

2. The method of claim 1, wherein the classification function is a softmax function.

3. The method of claim 1, comprising:
classifying into pre-defined levels the detected headings from among the list of grouped textblocks of markup elements.

4. The method of claim 3, wherein classifying into pre-defined-levels the detected headings from among the list of grouped textblocks comprises, for a detected heading:
generating by a second trained neural network a third vector corresponding to a semantic representation of the detected heading, wherein the second trained neural network is distinct from the first trained neural network, and wherein the third vector is a semantic vector;
generating a fourth vector based on evaluation of the pre-defined features in the detected heading; and
classifying by a second trained classifier the detected heading as one of the pre-defined levels based on the third and fourth vectors, wherein the second trained classifier is distinct from the first trained classifier.

5. The method of claim 4, comprising:
concatenating the third and fourth vectors to generate a fifth vector;
convoluting the fifth vector with equivalent vectors associated with one or more preceding detected headings and one or more subsequent detected headings relative to the detected heading; and
applying a classification function on the convolution result to determine a probability that the detected heading belongs to a given pre-defined level of the pre-defined levels; and
assigning a pre-defined level to the detected heading based on the determined probability.

6. The method of claim 4, wherein the second trained neural network is a word-level convolutional neural network (CNN) or a word-level recurrent neural network (RNN).

7. The method of claim 1, wherein the first trained neural network is a character-level convolutional neural network (CNN).

8. The method of claim 1, wherein said each element of the markup language file includes the respective element of the computer document or a link thereto and layout information associated with the respective element.

9. The method of claim 1, wherein generating the list of grouped textblocks comprises:
processing the markup language file to generate a list of text spans;
filtering out text spans corresponding to headers or footer from the list of text spans to generate a filtered list of text spans;
generating a list of textblocks from the filtered list of text spans; and
generating the list of grouped textblocks from the list of textblocks.

10. The method of claim 9, wherein processing the markup language file to generate the list of text spans comprises processing the markup language file to retain only elements corresponding to text elements of the computer document.

11. The method of claim 9, wherein generating the list of grouped textblocks comprises:
comparing layout information associated with at least two textblocks of the list of textblocks, the at least two textblocks being consecutive elements in the list of textblocks; and
generating a grouped textblock based on the at least two textblocks depending on a result of said comparing.

12. The method of claim 11, wherein comparing the layout information associated with at least two textblocks comprises comparing the layout information of the at least two textblocks based on one or more of: font, font size, style, vertical position, and horizontal position.

13. The method of claim 11, wherein the generated grouped textblock comprises layout information based at least in part on a combination of layout information associated with the at least two textblocks.

14. A non-transitory computer readable medium having computer instructions stored thereon, the computer instructions, when executed by a processor, cause the processor to perform a method for generating a table of contents (TOC) from a computer document not containing an embedded TOC, the method comprising:

converting the computer document into a markup language file comprising a plurality of markup elements, each markup element corresponding to a respective document element of the computer document;

generating a list of grouped textblocks of markup elements from the markup language file, a grouped textblock of markup elements comprising one or more layout-similar elements of the plurality of markup elements of the markup language file;

detecting a plurality of headings from among the list of grouped textblocks of markup elements, wherein detecting the headings comprises, for a grouped textblock of markup elements of the list of grouped textblocks of markup elements:

generating by a first trained neural network; a first vector corresponding to a semantic representation of the grouped textblock of markup elements, wherein the first vector is a semantic vector;

generating a second vector based on evaluation of pre-defined features in the grouped textblock of markup elements; and classifying by a first trained classifier the grouped textblock of markup elements as a heading or a plain-text based on the first and second vectors, wherein said classifying comprises:

concatenating the first and second vectors;

applying a classification function on the concatenation of the first and second vectors to determine a probability that the grouped textblock of markup elements is a heading; and determining that the grouped textblock of markup elements is a heading or a plain-text based on the determined probability.

15. The non-transitory computer readable medium of claim 14, the method comprising:

classifying into pre-defined levels the detected headings from among the list of grouped textblocks of markup elements.

16. The non-transitory computer readable medium of claim 15, wherein classifying into pre-defined levels the detected headings from among the list of grouped textblocks of markup elements comprises, for a detected heading:

generating by a second trained neural network a third vector corresponding to a semantic representation of the detected heading, wherein the second trained neural network is distinct from the first trained neural network, and wherein the third vector is a semantic vector;

generating a fourth vector based on evaluation of the pre-defined features in the detected heading; and classifying by a second trained classifier the detected heading as one of the pre-defined levels based on the third and fourth vectors, wherein the second trained classifier is distinct from the first trained classifier.

17. The non-transitory computer readable medium of claim 16, comprising:

concatenating the third and fourth vectors to generate a fifth vector;

convoluting the fifth vector with equivalent vectors associated with one or more preceding detected headings and one or more subsequent detected headings relative to the detected heading; and applying a classification function on the convolution result to determine a probability that the detected heading belongs to a pre-defined level of the pre-defined levels; and assigning a pre-defined level to the detected heading based on the determined probability.

18. The non-transitory computer readable medium of claim 14, wherein generating the list of grouped textblocks comprises:

processing the markup language file to generate a list of text spans;

filtering out text spans corresponding to headers or footer from the list of text spans to generate a filtered list of text spans;

generating a list of textblocks from the filtered list of text spans; and generating the list of grouped textblocks from the list of textblocks.

* * * * *